(12) United States Patent
McGuire et al.

(10) Patent No.: US 7,946,558 B2
(45) Date of Patent: *May 24, 2011

(54) HIGH-PRESSURE PLUG VALVE

(75) Inventors: Bob McGuire, Moore, OK (US); L. Murray Dallas, Streetman, TX (US)

(73) Assignee: Stinger Wellhead Protection, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,921

(22) Filed: Apr. 6, 2010

(65) Prior Publication Data
US 2010/0187461 A1  Jul. 29, 2010

Related U.S. Application Data

(60) Continuation of application No. 11/787,388, filed on Apr. 16, 2007, now Pat. No. 7,703,205, which is a division of application No. 10/912,944, filed on Aug. 6, 2004, now Pat. No. 7,204,474.

(51) Int. Cl.
*F16K 5/00* (2006.01)
(52) U.S. Cl. ........................................ 251/312; 251/304
(58) Field of Classification Search .................. 251/304, 251/309, 312
See application file for complete search history.

(56) References Cited

U.S. PATENT DOCUMENTS

| | | | |
|---|---|---|---|
| 3,323,537 A | 6/1967 | Shafer | |
| 3,474,818 A | 10/1969 | Hartman | |
| 3,497,179 A | 2/1970 | Smyers, Jr. | |
| 3,567,177 A | 3/1971 | Mueller | |
| 3,750,430 A | 8/1973 | Crisa | |
| 3,768,512 A | 10/1973 | Lahaye | |
| 3,964,507 A | 6/1976 | Jandrasi et al. | |
| 4,113,228 A * | 9/1978 | Frye | 251/159 |
| 4,132,388 A | 1/1979 | Billeter | |
| 4,145,026 A | 3/1979 | Chronister | |
| 4,257,447 A | 3/1981 | Clarkson | |
| 4,316,483 A | 2/1982 | Jandrasi | |
| 4,478,388 A | 10/1984 | George | |
| 4,867,653 A | 9/1989 | Mills et al. | |
| 4,989,631 A | 2/1991 | Harbin | |
| 5,123,439 A | 6/1992 | Powers | |
| 5,149,054 A * | 9/1992 | Passerell et al. | 251/309 |
| 5,234,193 A | 8/1993 | Neal et al. | |
| 5,577,708 A | 11/1996 | Pfannenschmidt | |
| 5,582,200 A | 12/1996 | Kimpel et al. | |
| 5,586,749 A | 12/1996 | Conley et al. | |
| 5,746,417 A * | 5/1998 | Bowers et al. | 251/315.12 |
| 5,881,996 A | 3/1999 | Walsh et al. | |

(Continued)

OTHER PUBLICATIONS

MSI Big Bore LT Brochure/Manual.

(Continued)

*Primary Examiner* — John K Fristoe, Jr.
(74) *Attorney, Agent, or Firm* — Nelson Mullins Riley & Scarborough, LLP

(57) ABSTRACT

A plug valve has a valve body, a cage fitted within the valve body and a rotatable plug housed within a cylindrical cavity in the cage, for controlling fluid flow through the valve. The cage has first and second opposed flat side surfaces, each side surface has a port for receiving a replaceable flow-path insert in a fluid-tight seal. In one embodiment, the plug also includes at least one inset seal for sealing the at least one of the ports when the plug is in a closed position to inhibit leakage through the valve at low fluid pressures.

20 Claims, 3 Drawing Sheets

U.S. PATENT DOCUMENTS

| | | |
|---|---|---|
| 6,029,685 A | 2/2000 | Carruth |
| 6,059,148 A | 5/2000 | Keller et al. |
| 6,090,206 A | 7/2000 | Bang et al. |
| 6,446,664 B1 | 9/2002 | Parsons |
| 6,469,271 B1 | 10/2002 | McGoey |
| 6,675,825 B1 | 1/2004 | Reeves et al. |
| 7,204,474 B2 | 4/2007 | McGuire et al. |
| 7,213,641 B2 | 5/2007 | McGuire et al. |
| 7,278,490 B2 | 10/2007 | McGuire et al. |
| 7,481,418 B2 | 1/2009 | Artherholt |
| 2005/0006150 A1 | 1/2005 | Sims et al. |
| 2007/0251578 A1 | 11/2007 | McGuire |

OTHER PUBLICATIONS

Xomox Corporation, Process Valves & Actuators Brochure.

* cited by examiner

HIGH-PRESSURE PLUG VALVE

CROSS-REFERENCE TO RELATED APPLICATIONS

This application is a continuation of U.S patent application Ser. No. 11/787,388 filed on Apr. 16, 2007, now U.S. Pat. No. 7,703,205, which was a division of U.S. patent application Ser. No. 10/912,944 filed on Aug. 6, 2004, now U.S. Pat. No. 7,204,474, the entire disclosures of which are incorporated by reference herein.

MICROFICHE APPENDIX

Not Applicable.

TECHNICAL FIELD

The present invention relates in general to high-pressure valves for the oil and gas industry and, in particular, to plug valves used in severe service applications in which flow path components of the valve are subject to wear.

BACKGROUND OF THE INVENTION

Plug valves are used in the oil and gas industry for heating and treating systems, cementing, fracturing and acidizing and other well stimulation applications in which high working pressures and abrasive and/or corrosive fluids are conducted at high flow rates.

Prior art plug valves are subject to wear. However, attempts have been made to permit at least some components in the flow path to be replaced. For example, U.S. Pat. No. 6,675,825 to Reeves et al., includes a valve body, an insert (or "cage") fitted non-rotatably within the valve body and a plug rotatable within a cylindrical cavity in the cage between an open position, in which fluid flows through the valve, and a closed position, in which fluid flow is obstructed. In the open position, fluid flows through a bore through the plug. In the closed position, the bore in the plug is rotated perpendicular to the flow path and the plug blocks the flow path. When the cage and/or the plug become worn with use, one or both can be replaced without replacing the expensive valve body.

In use, a plug valve is frequently subjected to high pressures, corrosive fluids and abrasive proppants (such as sand, resin-coated sand or sintered bauxite) which tend to erode the components of the plug valve that form the flow path through the valve. As is well known in the art, component wear causes close-fitting components to loose their initial shape, thereby rendering the plug valve more prone to leaking. In order to mitigate the effects of wear, plug valves used in severe service conditions require regular maintenance and refurbishment. The non-replaceable components of plug valves are typically refurbished by welding new metal in the flow path, and then machining the flow path components back to their original tolerances. Not only is refurbishment by welding and machining time-consuming and expensive, but the mechanical and thermal properties of the weld are inferior to those of the steel used to make the plug valve. Furthermore, for sour service, where welds are exposed to $H_2S$, the welds are susceptible to sulphide stress corrosion cracking (SSCC).

Consequently, there is a need for a plug valve with improved erosion resistance that is more quickly and easily refurbished to original specifications.

A further common problem with high pressure plug valves is low pressure containment. Although plug valves generally provide a very reliable seal at high fluid pressures because in the closed position the high fluid pressures force the plug into a metal-to-metal sealing contact with the plug cage. However, when fluid pressures are low, especially with valves that have seen some severe service, the low pressure fluids may leak around the plug. This problem is most often experienced when setting up for a well stimulation treatment, or after flow back of the well before the pressure isolation equipment is removed from the wellhead. Leakage around the plug valve can permit hydrocarbons to escape to atmosphere, which is very undesirable.

There therefore also exists a need for a plug valve that provides a reliable seal at low fluid pressures.

SUMMARY OF THE INVENTION

It is therefore an object of the invention to provide a high-pressure plug valve with improved wear resistance.

It is another object of the invention to provide a plug valve that is quickly and easily refurbished to original specifications.

It is yet another object of the invention to provide a plug valve that provides a reliable fluid seal under low fluid pressure conditions.

In accordance with a first aspect of the invention, a plug valve includes a valve body and a replaceable cage fitted within the valve body, the cage defining a cylindrical cavity for receiving a plug for controlling fluid flow through the valve, the plug being rotatable between an open position in which fluid flows through the valve, and a closed position in which fluid flow is obstructed, and the cage has first and second opposed flat side surfaces, each surface having a port for receiving an end of a flow-path insert that defines a flow path through one side of the valve.

In one embodiment, each port includes a circumferential groove for receiving an annular sealing element to provide a fluid seal between the flow path insert and the cage.

Because the cage has flat side surfaces, the seals can be provided between the flow-path inserts and the ports. Furthermore, when the flow-path inserts and/or the cage has worn beyond an acceptable tolerance, the flow path inserts and the cage are easily and quickly replaced, thus reducing maintenance costs and significantly improving the longevity of the expensive plug valve body.

In accordance with a second aspect of the invention, a plug valve includes a valve body with first and second opposed ports in fluid communications with a flow path through the valve, the first and second ports communicating with a cylindrical cavity for receiving a plug for controlling fluid flow through the valve, the plug being rotatable between an open position, in which fluid flows through the valve, and a closed position, in which fluid flow is obstructed, and the plug comprises at least one inset seal for sealing at least one of the ports when the plug is in the closed position, the at least one inset seal being resiliently biased against at least one port when the plug is in a closed position to provide a fluid-tight seal at low fluid pressures.

In one embodiment, the at least one inset seal comprises an elastomeric material bonded to a metal backing.

The inset seal provides low-pressure sealing of the port, thereby inhibiting leakage at low fluid pressures which complement a metal-to-metal seal that forms between the plug and the cage at high fluid pressures. The plug valve in accordance with the second aspect of the invention thus inhibits leakage throughout a full range of operating pressures.

In accordance with a third aspect of the invention, a plug valve includes a valve body and a replaceable cage fitted within the valve body, the cage having first and second opposed ports for receiving flow-path inserts defining a flow path through the valve, the cage further defining a cylindrical space for receiving a plug for controlling fluid flow through the valve, the plug being rotatable between an open position, in which fluid flows through the valve, and a closed position, in which fluid flow is obstructed; wherein the plug comprises a pair of inset seals for sealing the ports when the plug is in the closed position, the inset seals being resiliently biased against the ports when the plug is in a closed position to provide a fluid-tight seal at low fluid pressures, and a closed position, in which fluid flow is obstructed.

In one embodiment, an annular sealing element provides a fluid-tight seal between each flow-path insert and the respective port.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

In general, and as will be explained in detail below, a plug valve in accordance with the invention includes a valve body, a cage fitted within the valve body and a rotatable plug housed within a cylindrical cavity in the cage. The plug can be rotated between an open position, in which fluid flows through the valve, and a closed position, in which fluid flow is obstructed. The cage has first and second opposed flat side surfaces, each side surface having a port for receiving a replaceable flow-path insert. In one embodiment, an annular sealing element, such as an elastomeric O-ring, provides a fluid-tight seal between the flow-path insert and the port. In another embodiment, the plug also includes at least one inset seal shaped to be substantially flush with the cylindrical surface of the plug. The inset seal has an outer surface of an elastomeric material for sealing at least one of the ports when the plug is in the closed position, thereby inhibiting leakage through the valve at low fluid pressures.

Figure 1:
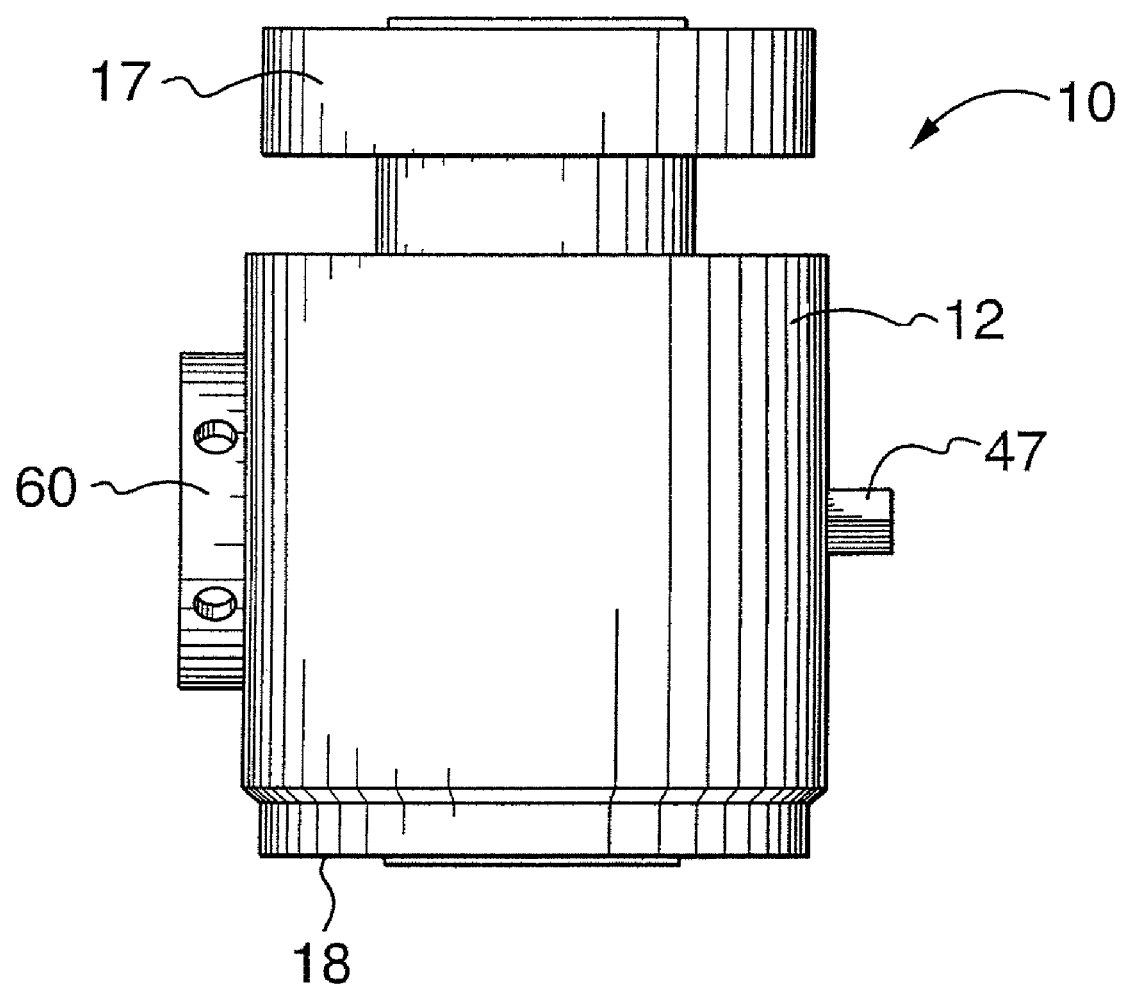
FIG. 1 is a side elevational view of a plug valve in accordance with the invention.

FIG. 1 is a side elevational view of a plug valve, generally indicated by the reference numeral 10, in accordance with an embodiment the invention. The plug valve includes a plug body 12, which is the most expensive component of the plug valve. The plug valve further includes a flange 17 for connecting the plug valve to other wellhead or flow control components and a stud pad 18. As is understood by those skilled in the art, either of the flange 17 and the stud pad 18 can be replaced with the other, so that the plug valve 10 includes either two flanges 17 or two stud pads 18. As will be explained below in further detail with reference to FIGS. 2-4, plug valve 10 further includes a hexagonal lug 47 to which a valve lever or valve wheel is connected in a manner well known in the art to move a plug of the valve from an open to a closed position. Plug valve 10 further includes a cap 60 which is removed to provide access to internal components of the plug valve 10, as will likewise be explained in more detail with reference to FIGS. 2-4.

Figure 2:
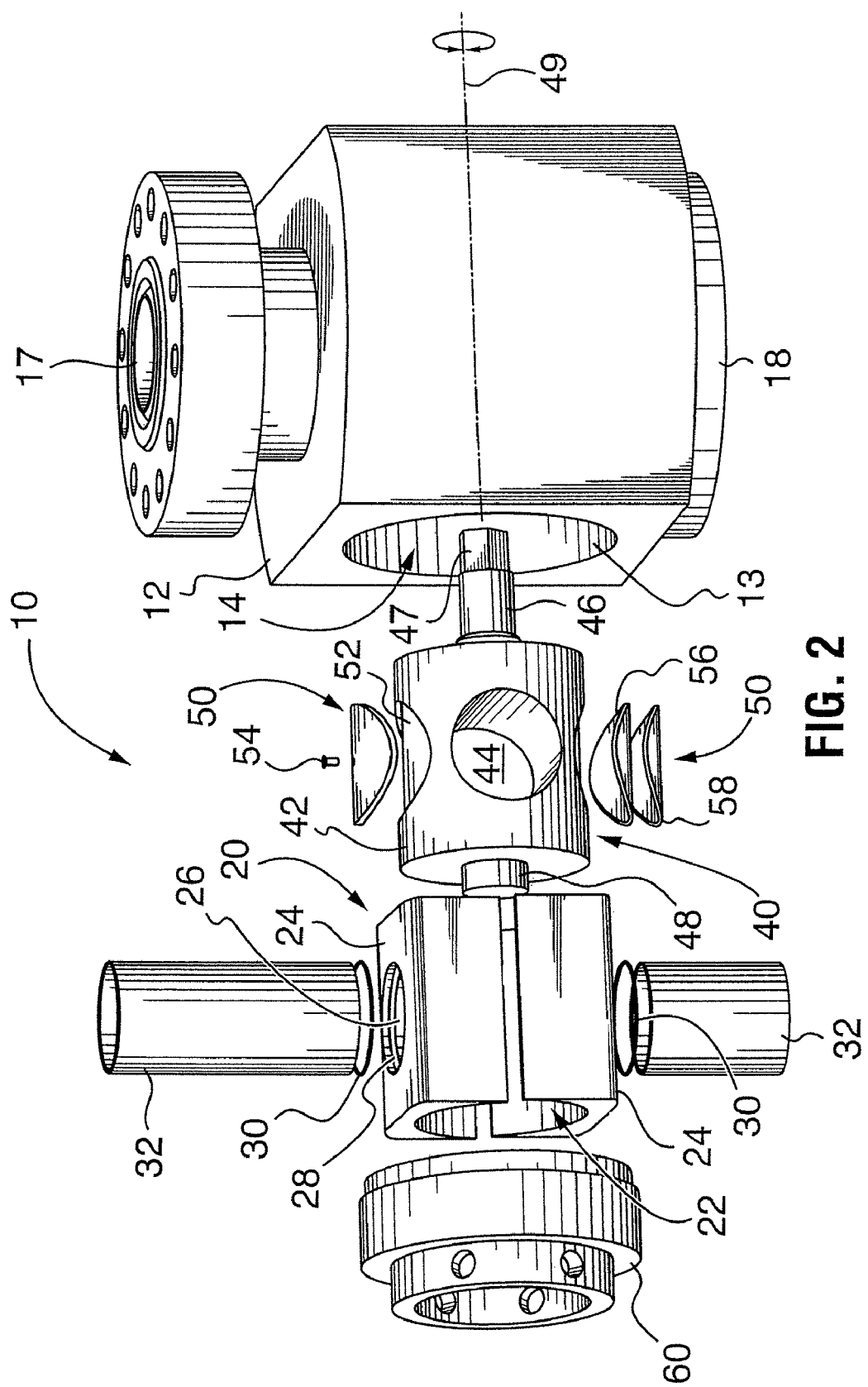
FIG. 2 is an exploded, perspective view of a plug valve in accordance with an embodiment of the invention.

FIG. 2 is an exploded, perspective view of the plug valve 10 in accordance with an embodiment of the invention. The plug valve 10 includes a valve body 12 and a cage 20 (also referred to as a plug insert) which is non-rotatably received within the valve body 12. A plug 40 is housed within the cage 20 and is rotatable between an open position, in which fluid flows through the valve, and a closed position, in which fluid flow is obstructed.

Figure 3:
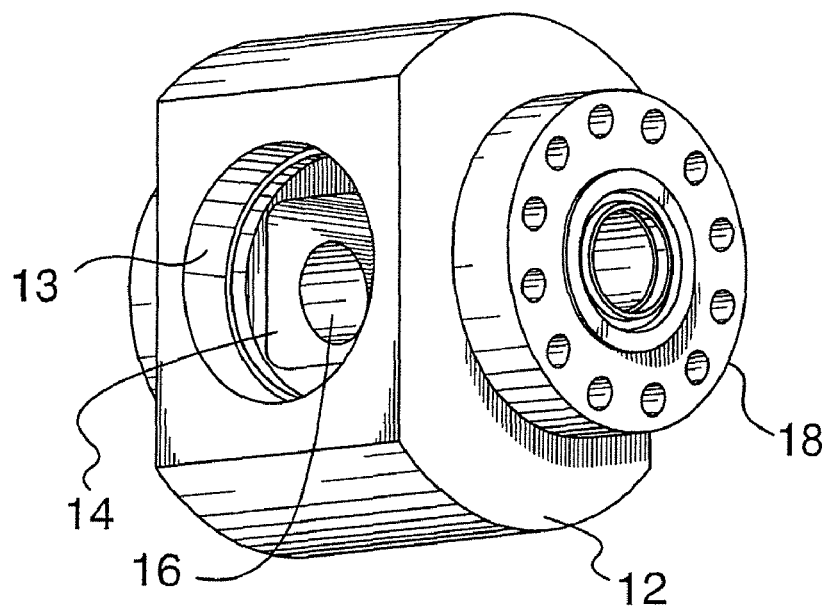
FIG. 3 is a perspective view of a valve body for use with the plug valve shown in FIG. 1.
Figure 4:
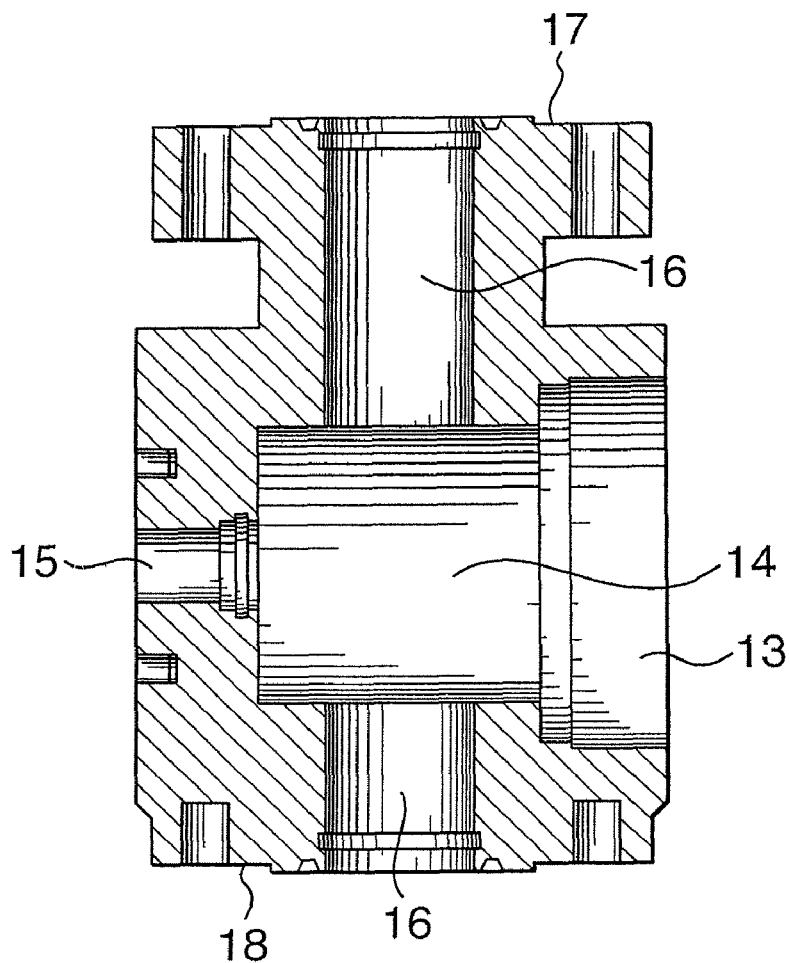
FIG. 4 is a cross-sectional view of the valve body shown in FIG. 2.

The cage 20 is received in a socket 14, shown in FIGS. 3 and 4, that is machined in the valve body 12 using a milling machine, for example. The socket 14 has flat, parallel side surfaces.

As shown in FIGS. 3 and 4, the valve body 12 also has a shallow, large-diameter cap bore 13 for receiving the cap 60. FIG. 3 also shows that the valve body is machined to have a stem bore 15 for accommodating a stem 46 of a valve plug 40 (FIG. 2), also described below. In addition, flow-path bores 16 are machined into the valve body 12 for receiving flow-path inserts 32 (FIG. 2), as will likewise be described below.

In one embodiment, the valve body 12 is machined from AISI 4130 or 4140 steel having a Rockwell Hardness of about 18-32.

As shown in FIG. 2, the cage 20 is a generally rectangular box-shaped insert which defines a cylindrical cavity 22 for receiving a generally cylindrical plug 40. The cage 20 can be machined as two symmetrical pieces (as shown) or as a single integral piece. In one embodiment, the cage 20 is machined from ductile iron having a yield strength of about 40-50 kpsi (275-345 MPa). In one embodiment, the iron is nitrite-hardened to have surface hardness of about Rockwell Hardness 60.

The cage 20 has first and second side surfaces 24 that are substantially flat. For the purposes of this specification, the qualification that the first and second side surfaces are substantially flat means that the exterior surfaces are substantially flat, not the interior surfaces which are curved to define the cylindrical cavity 22 for receiving the cylindrical plug 40.

The first and second side surfaces 24 are parallel and located on opposite sides of the cylindrical cavity 22. The first surface includes a circular port 26 which is aligned with a second circular port 26 in the second side surface 24. In one embodiment, each port 26 includes a circumferential groove 28 for receiving an annular sealing element 30, such as an O-ring. Each port 26 is a circular aperture adapted to receive an end of a replaceable flow-path insert 32. The flow-path inserts 32 are inserted into the flow-path bores 16 in the valve body 12 (see FIGS. 3 and 4). The annular sealing element 30, which is received in the circumferential groove 28 in each port 26, thus provides a fluid-tight seal between the cage 20 and the end of the flow-path insert 32. In one embodiment, the flow-path inserts are machined from AISI 4340 heat-treated steel having a Rockwell Hardness of about 50-52. Alternatively, for sour service, the flow-path inserts may be machined from HH 1150 NACE Trim stainless steel having a Rockwell Hardness of about 35. The HH 1150 NACE Trim is a stainless steel specified in the standards of the National Association of Corrosion Engineers and is known in the art to provide superior corrosion resistance for use in certain sour service environments.

As shown in FIG. 2, the plug 40 is a generally cylindrical body 42 through which a transverse bore 44 is machined. The transverse bore 44 provides a flow passage through which fluid may flow when the plug is in the open position. The plug 40 has a stem 46 that protrudes from a first end of the plug and which is housed within the stem bore 15 (FIG. 4) in the valve body. The stem 46 includes a hexagonal lug to which is mounted a valve lever or a valve wheel for rotating the plug from the open position to the closed position, or vice versa. The plug 40 includes a stubby, cylindrical axial stud 48 that protrudes from an opposite end of the plug, for aligning the plug within the cage 20 and the valve body 12. In one embodiment, the plug is machined from nitrite-hardened HH 1150 NACE Trim stainless steel.

In one embodiment, the plug valve 10 further includes at least one inset seal 50 which fits within a machined recess 52 in an outer surface of the body 42 of the plug 40. In one embodiment, a machined fastener such as a screw 54 is used to fasten the inset seal 50 to the plug 40. The inset seal 50 has the same curvature as the plug 40 so that the inset seal 50 fits flush with the outer surface of the plug. In one embodiment, the inset seal 50 is replaceable and includes an elastomeric material 56 bonded to a metal backing 58. As will be understood by those skilled in the art, the inset seal 50 may likewise be an elastomeric material bonded directly to the machined recess 52. In one embodiment, a pair of inset seals 50 is provided, as shown in FIG. 2, so that low pressure sealing is provided regardless of an orientation of the plug valve 10.

When the plug is in the closed position, the inset seal is resiliently biased against the port 26 of the cage 20, thereby providing a fluid-tight seal at low fluid pressures. In one embodiment, the elastomeric material 56 is polyurethane or nitrile rubber with a durometer of 70-100. The metal backing 58 is made of stainless steel, aluminum, bronze or brass, for example. When the inset seal 50 becomes worn, it can be removed (by removing the screw 54) and replaced with a new inset seal 50, thus prolonging the low-pressure service life of the plug valve 10.

As described above, the valve body 12 has a cap bore 13 that threadedly secures the cap 60. The cap 60 is threadedly secured to the valve body 12 to retain the cage 20 and plug 40 within the socket 14 of the valve body 12. In one embodiment, the cap 60 is machined from AISI 4140 heat-treated steel.

In operation, the plug valve 10 can be opened and closed by rotating the plug 40 through ninety degrees by applying torque to the hexagonal lug 47 using a wheel, lever or other such valve actuator. As was described above, the plug 40 can be rotated from an open position, in which fluid may flow through the valve, to a closed position, in which fluid flow is obstructed. The plug 40, stem 46 and stud 48 define an axis of rotation 49 within the cylindrical cavity 22 in the cage 20.

When the plug valve 10 is opened and closed, the transverse bore 44 and inset seals 50 rotate about the axis of rotation. In the open position, the transverse bore 44 aligns with the ports 26 and flow-path inserts 32, thus providing the flow path through the valve. In the closed position, the transverse bore 44 is perpendicular to the flow path, thereby obstructing fluid flow. In the closed position, the inset seals 50 align with the ports 26 and flow-path inserts 32 to seal the ports 26 of the cage 20. In the closed position, the elastomeric inset seals 50 are resiliently biased against the ports 26, thereby inhibiting leakage at low fluid pressures. Complementing the low-pressure inset seals 50 is a metal-to-metal seal that forms between the plug 40 and the cage 20 at high fluid pressures. The plug valve 10 thus inhibits leakage throughout a full range of operating pressures.

The plug valve 10 can be efficiently serviced by replacing worn out components rather than refurbishing the valve by welding and re-machining. The replaceable components of the plug valve 10 are the plug 40, the inset seals 50 and associated fasteners 54, the cage 20, and the flow-path inserts 32 with associated annular sealing elements 30. By disassembling the plug valve 10, these components can be quickly and efficiently replaced to refurbish the plug valve 10 to its original specifications. Since the expensive valve body 12 is untouched by abrasive fluids during service, the valve body can continue to be used for many years. The plug valve 10 therefore reduces maintenance costs because plug valve 10 is quickly refurbished by workmen without sophisticated welding and machining skills. The plug valve 10 also reduces overhead because valves can be quickly refurbished, so fewer valves are required.

Persons of ordinary skill in the art will appreciate, in light of this specification, that minor variations may be made to the components of the plug valve without departing from the sprit and scope of the invention. The embodiments of the invention described above are therefore intended to be exemplary only and the scope of the invention is limited only by the scope of the appended claims.

We claim:

1. A plug valve comprising:
   a valve body;
   a replaceable cage received within the valve body and having first and second opposed flat exterior side surfaces that respectively include a port, the replaceable cage defining a cylindrical cavity that receives a valve plug rotatable between an open position in which fluid flows through a fluid path through the vale body, and a closed position in which fluid flow through the fluid path is obstructed; and
   first and second flow-path inserts that line the flow path through the valve body and respectively have an inner end received in a respective one of the ports in the replaceable cage.

2. The plug valve as claimed in claim 1 wherein the replaceable cage comprises a generally rectangular box-shaped insert.

3. The plug valve as claimed in claim 2 wherein the replaceable cage is a two-piece structure, each piece including a one of the opposed flat exterior side surfaces that includes the port.

4. The plug valve as claimed in claim 1 further comprising a fluid seal around the inner end of each of the first and second flow-path inserts.

5. The plug valve as claimed in claim 1 wherein the valve plug comprises first and second inset seals that respectively align with a respective one of the ports when the valve plug is in the closed position.

6. The plug valve as claimed in claim 5 wherein the first and second inset seals are resiliently biased against the respective ports to provide a fluid-tight seal at low fluid pressures.

7. The plug valve as claimed in claim 6 wherein the respective inset seals comprise an elastomeric material bonded to a metal disk.

8. The plug valve as claimed in claim 6 wherein the respective inset seals comprise a machined surface of the valve plug and an elastomeric material bonded to the machined surface.

9. A plug valve comprising:
   a valve body; and
   a replaceable cage non-rotatably received within a socket in the valve body, the replaceable cage having first and second opposed flat, parallel side surfaces that respectively include a port that receives an inner end of a replaceable flow-path insert that lines a flow path through the valve body, the replaceable cage further defining a cylindrical cavity for receiving a valve plug that is rotatable between an open position in which fluid flows through the flow path, and a closed position in which fluid flow through the flow path is obstructed.

10. The plug valve as claimed in claim 9 wherein each replaceable flow-path insert comprises a planar end received in a respective one of the ports.

11. The plug valve as claimed in claim 9 further comprising a fluid-tight seal between an inner end of each replaceable flow-path insert and the respective one of the ports.

12. The plug valve as claimed in claim 11 wherein the respective fluid-tight seals comprise O-rings.

13. The plug valve as claimed in claim 9 wherein the replaceable cage comprises a ductile metal with a hardened surface.

14. The plug valve as claimed in claim 9 wherein the valve plug comprises at least one inset seal for sealing at least one of the first and second ports when the valve plug is in the closed position:

15. The plug valve as claimed in claim 14 wherein the at least one inset seal comprises first and second inset seals for sealing the respective ports.

16. The plug valve as claimed in claim 14 wherein the at least one inset seal comprises an elastomeric material bonded to a metal backing.

17. The plug valve as claimed in claim 16 wherein the metal backing comprises a metal disk.

18. The plug valve as claimed in claim 17 further comprising at least one mechanical fastener that secures the at least one inset seal to the valve plug.

19. The plug valve as claimed in claim 16 wherein the metal backing comprises a machined surface of the valve plug and the elastomeric material is bonded to the machined surface.

20. A plug valve that provides a fluid seal at low fluid pressures, comprising:
   a valve body;
   a replaceable cage received within a socket in the valve body, the replaceable cage defining a cylindrical cavity that receives a valve plug rotatable between an open position in which fluid flows through a fluid path through the valve body, and a closed position in which fluid flow through the fluid path is obstructed, the replaceable cage having first and second opposed flat side surfaces respectively including a port;
   first and second flow-path inserts that line the flow path and have a respective inner end and a respective outer end, the inner end of each flow path insert being received in a respective one of the ports; and
   first and second fluid seals inset in the valve plug that align with the respective ports when the valve plug is in the closed position to provide the fluid seal at the low fluid pressures.

* * * * *

UNITED STATES PATENT AND TRADEMARK OFFICE
CERTIFICATE OF CORRECTION

| | | |
|---|---|---|
| PATENT NO. | : 7,946,558 B2 | |
| APPLICATION NO. | : 12/754921 | |
| DATED | : May 24, 2011 | |
| INVENTOR(S) | : Bob McGuire and L. Murray Dallas | |

It is certified that error appears in the above-identified patent and that said Letters Patent is hereby corrected as shown below:

In the specification:
In the specification, column 5, line 2, please add the number --47-- after the word "lug".
In the specification, column 5, line 24, please add the number --50-- after the word "seal".

Signed and Sealed this
Twenty-fifth Day of September, 2012

David J. Kappos
*Director of the United States Patent and Trademark Office*